United States Patent
Foskey et al.

(10) Patent No.: US 9,896,199 B2
(45) Date of Patent: Feb. 20, 2018

(54) ROTOR HUB FOR A ROTORCRAFT

(71) Applicant: Bell Helicopter Textron Inc., Fort Worth, TX (US)

(72) Inventors: Christopher Foskey, Keller, TX (US); Drew Sutton, Hurst, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 933 days.

(21) Appl. No.: 14/135,941

(22) Filed: Dec. 20, 2013

(65) Prior Publication Data
US 2015/0175259 A1  Jun. 25, 2015

(51) Int. Cl.
| B64C 27/72 | (2006.01) |
|---|---|
| B64C 27/00 | (2006.01) |
| B64C 27/35 | (2006.01) |
| B64C 27/37 | (2006.01) |

(52) U.S. Cl.
CPC ............ *B64C 27/72* (2013.01); *B64C 27/001* (2013.01); *B64C 27/35* (2013.01); *B64C 27/37* (2013.01); *B64C 2027/003* (2013.01); *B64C 2027/004* (2013.01); *B64C 2027/7216* (2013.01)

(58) Field of Classification Search
CPC ....... B64C 27/001; B64C 27/72; B64C 27/32; B64C 27/35; B64C 27/37; B64C 27/51; B64C 2027/002; B64C 2027/003; B64C 2027/004; B64C 2027/7216
See application file for complete search history.

(56) References Cited

U.S. PATENT DOCUMENTS

| 2,402,349 | A | * | 6/1946 | Sikorsky | B64C 27/52 244/66 |
|---|---|---|---|---|---|
| 2,529,635 | A | * | 11/1950 | Sikorsky | B64C 27/30 416/114 |
| 3,176,774 | A | * | 4/1965 | Krinsky | B64C 27/52 244/17.19 |
| 4,073,600 | A | | 2/1978 | Doman | |
| 5,242,130 | A | * | 9/1993 | Mouille | B64C 27/001 244/17.13 |
| 5,647,726 | A | | 7/1997 | Sehgal et al. | |

(Continued)

FOREIGN PATENT DOCUMENTS

| EP | 0521759 A1 | 1/1993 |
|---|---|---|
| EP | 2796368 A1 | 10/2014 |

OTHER PUBLICATIONS

European Search Report in related European Application No. 14176752.5, dated Dec. 23, 2014, 3 pages.

(Continued)

*Primary Examiner* — Jason Shanske
*Assistant Examiner* — Julian Getachew
(74) *Attorney, Agent, or Firm* — Timmer Law Group, PLLC

(57) ABSTRACT

A rotor hub can include a yoke, a mast, and one or more radially oriented actuators. The first radial actuator and the second radial actuator each have a piston configured to impart a translation of the yoke relative to the mast. The radial actuators are configured to attenuate in-plane whirling vibrations. The rotor hub can also have actuators coupled between the mast and the yoke for attenuating flapping and vertical vibrations.

10 Claims, 9 Drawing Sheets

(56) References Cited

U.S. PATENT DOCUMENTS

| | | | | |
|---|---|---|---|---|
| 6,607,357 | B2* | 8/2003 | Caramaschi | B64C 27/35 |
| | | | | 416/134 A |
| 8,226,355 | B2* | 7/2012 | Stamps | B64C 27/32 |
| | | | | 415/119 |
| 2007/0215749 | A1 | 9/2007 | Miner et al. | |
| 2009/0180882 | A1* | 7/2009 | Stille | B64C 27/51 |
| | | | | 416/140 |
| 2010/0266411 | A1* | 10/2010 | Stamps | B64C 29/0033 |
| | | | | 416/131 |

OTHER PUBLICATIONS

European Examination Report in related European Application No. 14176752.5, dated Feb. 13, 2015, 6 pages.
Communication under Rule 71(3) EPC, Intention to Grant, dated Aug. 10, 2015, by the EPO, re Patent Application No. 14176752.5.

* cited by examiner

ROTOR HUB FOR A ROTORCRAFT

BACKGROUND

Technical Field

The present disclosure relates to a rotor hub for a rotorcraft, as well as a rotor hub vibration control system for a rotorcraft.

Description of Related Art

Main rotor vibrations have always been an issue for helicopters and other types of rotorcraft. Various solutions for passive vibration control have been developed including: pendulum dampers, bifilar dampers, spring mass dampers, and pylon isolators, to name a few examples. Such systems sometime work well, but are limited in frequency range and have a large weight penalty. As an alternative to passive systems, some active systems have been developed. Active systems can attempt to eliminate vibrations from reaching the fuselage, instruments, and structure; however, such active systems treat the vibrations as frequencies rather than as discrete directional vibrations. As a result, the vibrations can become coupled and be may not be canceled individually. Additionally, the active systems are typically located in various areas of the aircraft, but not in the primary vibration path.

There is a need for an improved rotor hub and rotor hub vibration control system.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
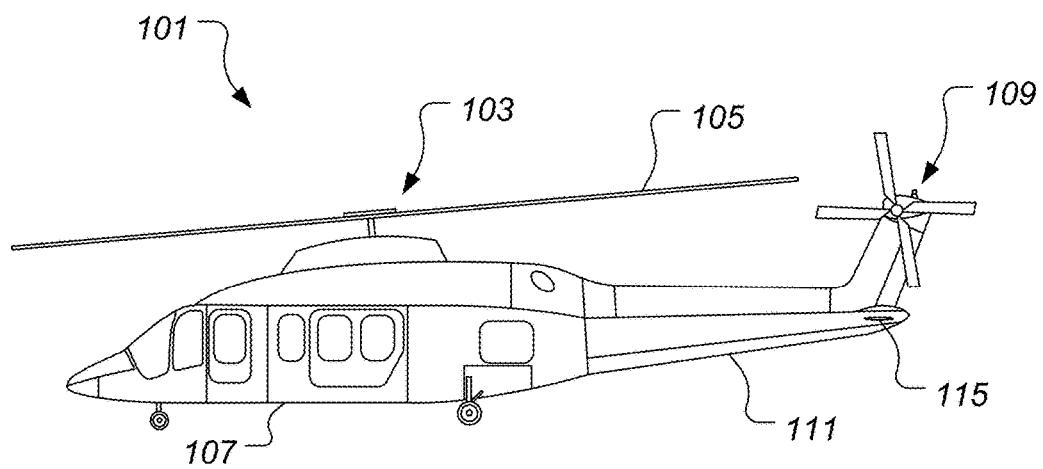
FIG. 1 is a side view of a rotorcraft, according to an example embodiment.
Figure 2:
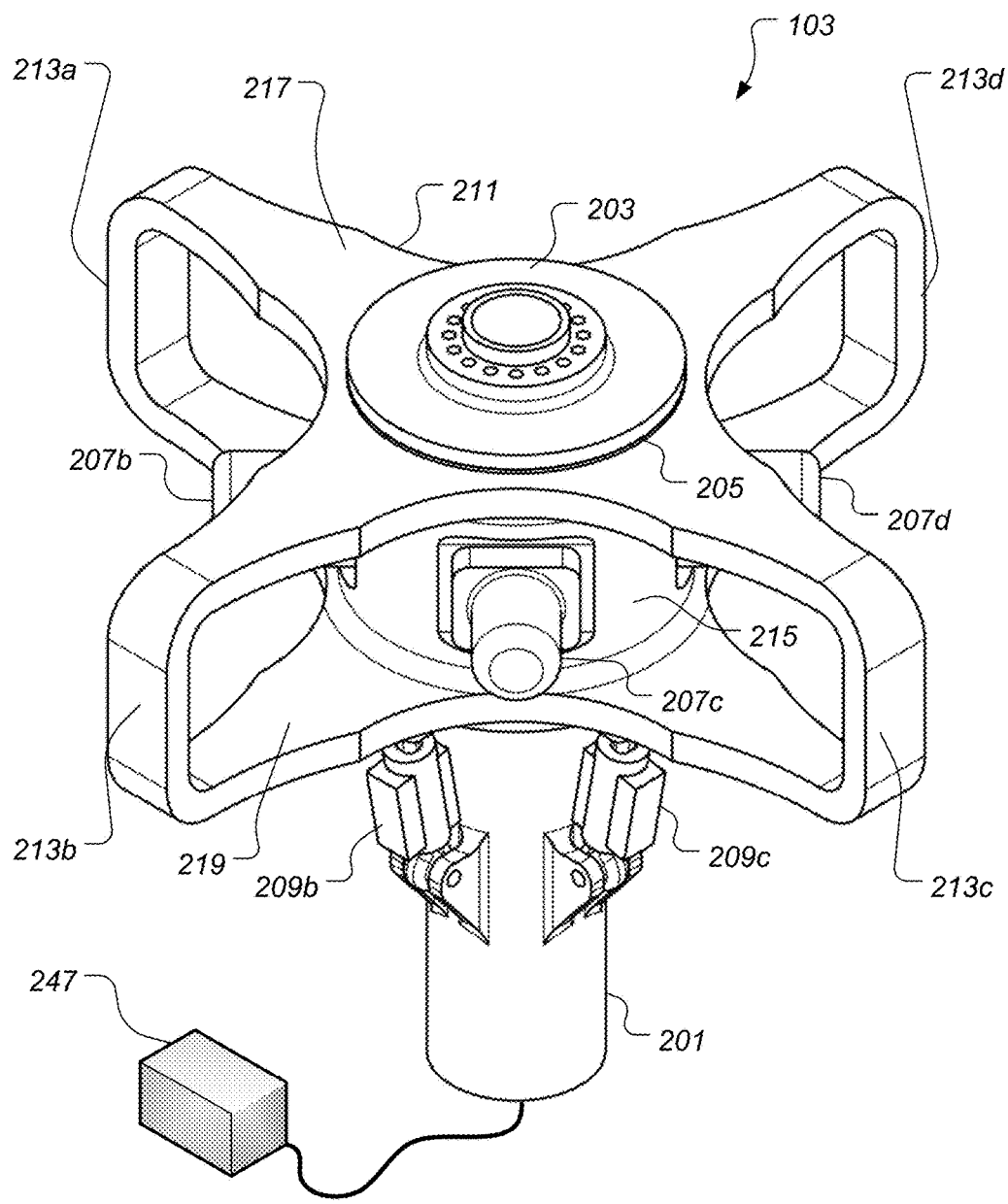
FIG. 2 is a perspective view of a rotor hub of the rotorcraft, according to an example embodiment.
Figure 3:
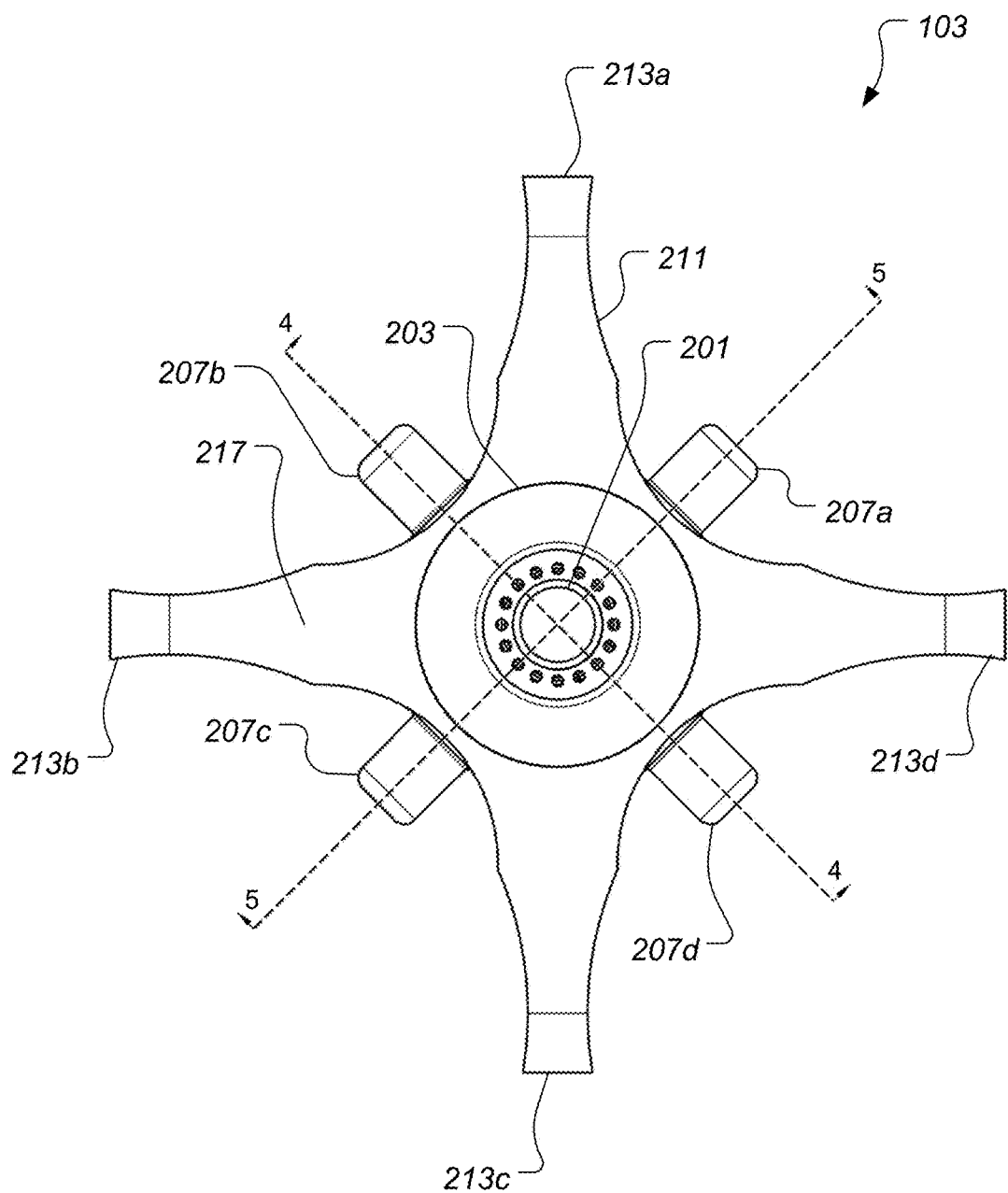
FIG. 3 is a top view of a rotor hub of the rotorcraft, according to an example embodiment.
Figure 4:
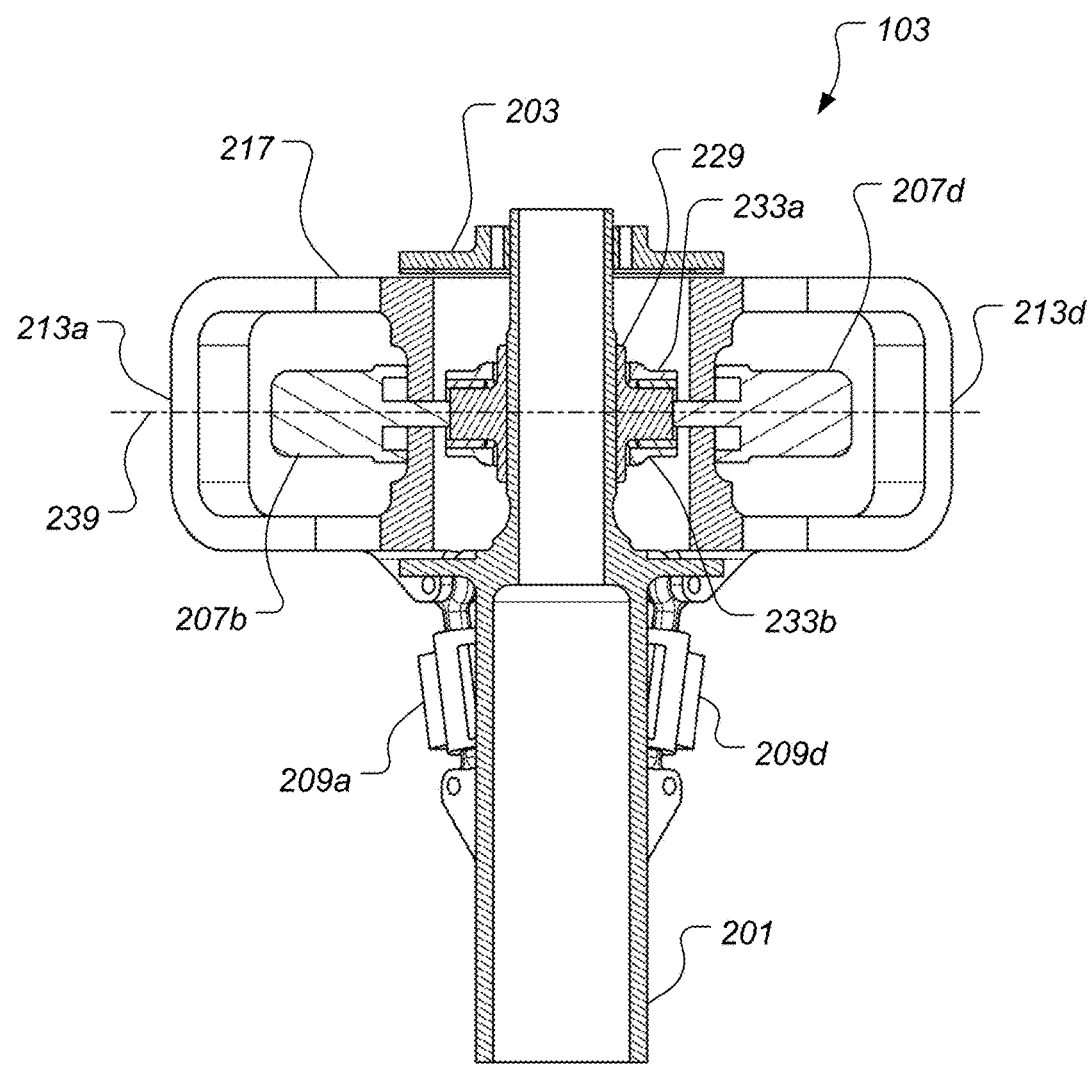
FIG. 4 is a cross-sectional view of the rotor hub, taken from section lines 4-4 in FIG. 3, according to an example embodiment.
Figure 5:
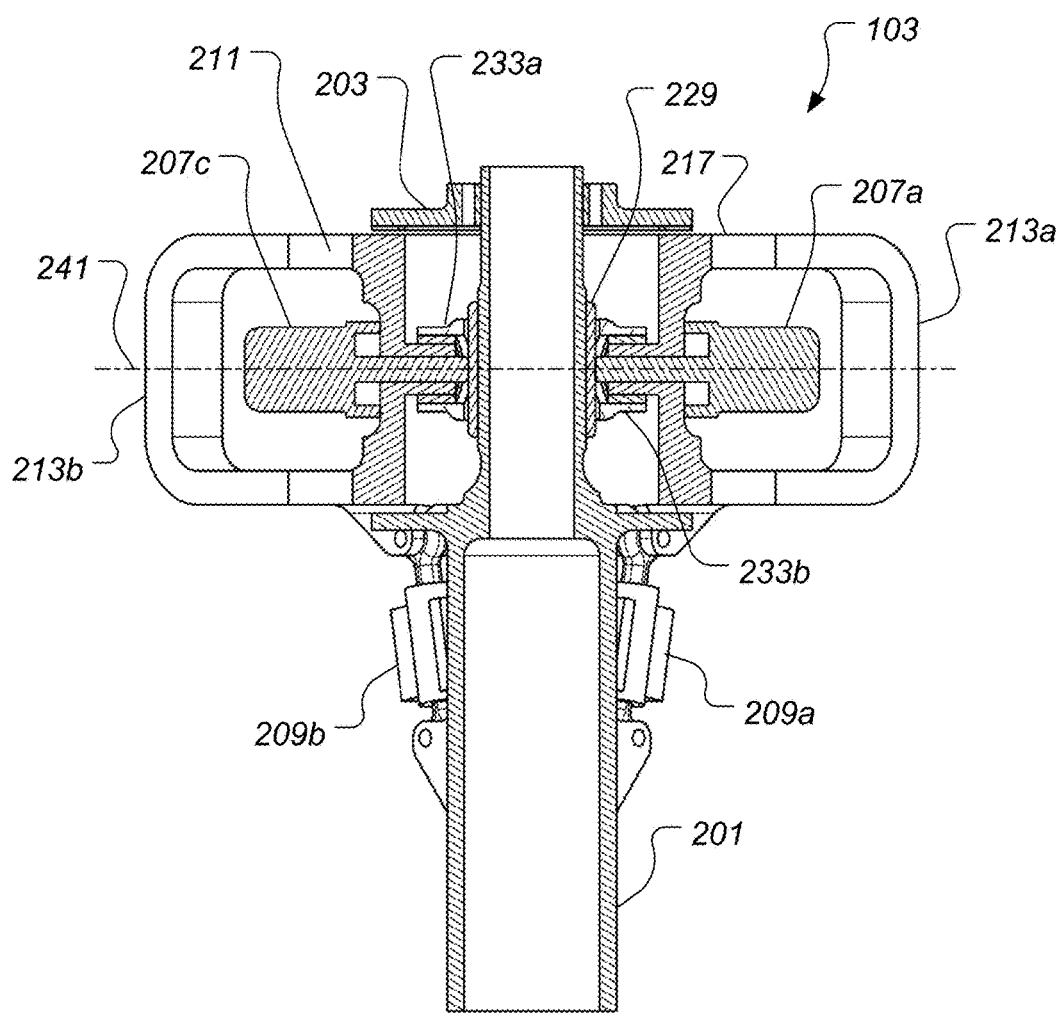
FIG. 5 is a cross-sectional view of the rotor hub, taken from section lines 5-5 in FIG. 3, according to an example embodiment.

Referring now to FIG. 1 in the drawings, a rotorcraft 101 is illustrated. Rotorcraft 101 has a rotor hub 103 with a plurality of rotor blades 105. The pitch of each rotor blade 105 can be manipulated in order to selectively control direction, thrust, and lift of rotorcraft 101. Rotorcraft 101 can further include a fuselage 107, anti-torque system 109, and an empennage 111. It should be appreciated that rotorcraft 101 is merely illustrative of an aircraft for with which the embodiments of the present disclosure can be utilized.

Figure 7:
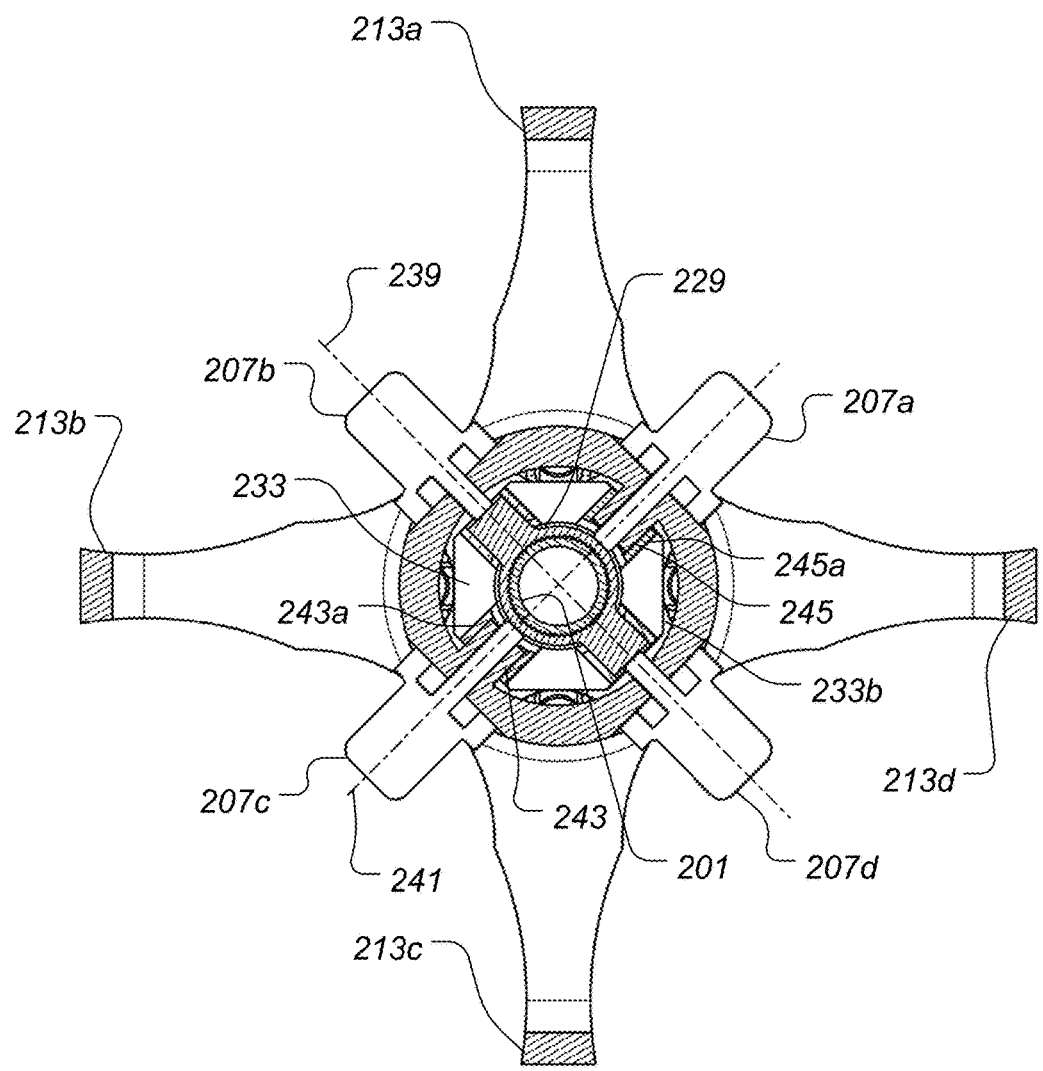
FIG. 7 is a cross-sectional view of the rotor hub, taken from section lines 7-7 in FIG. 6, according to an example embodiment.
Figure 8:
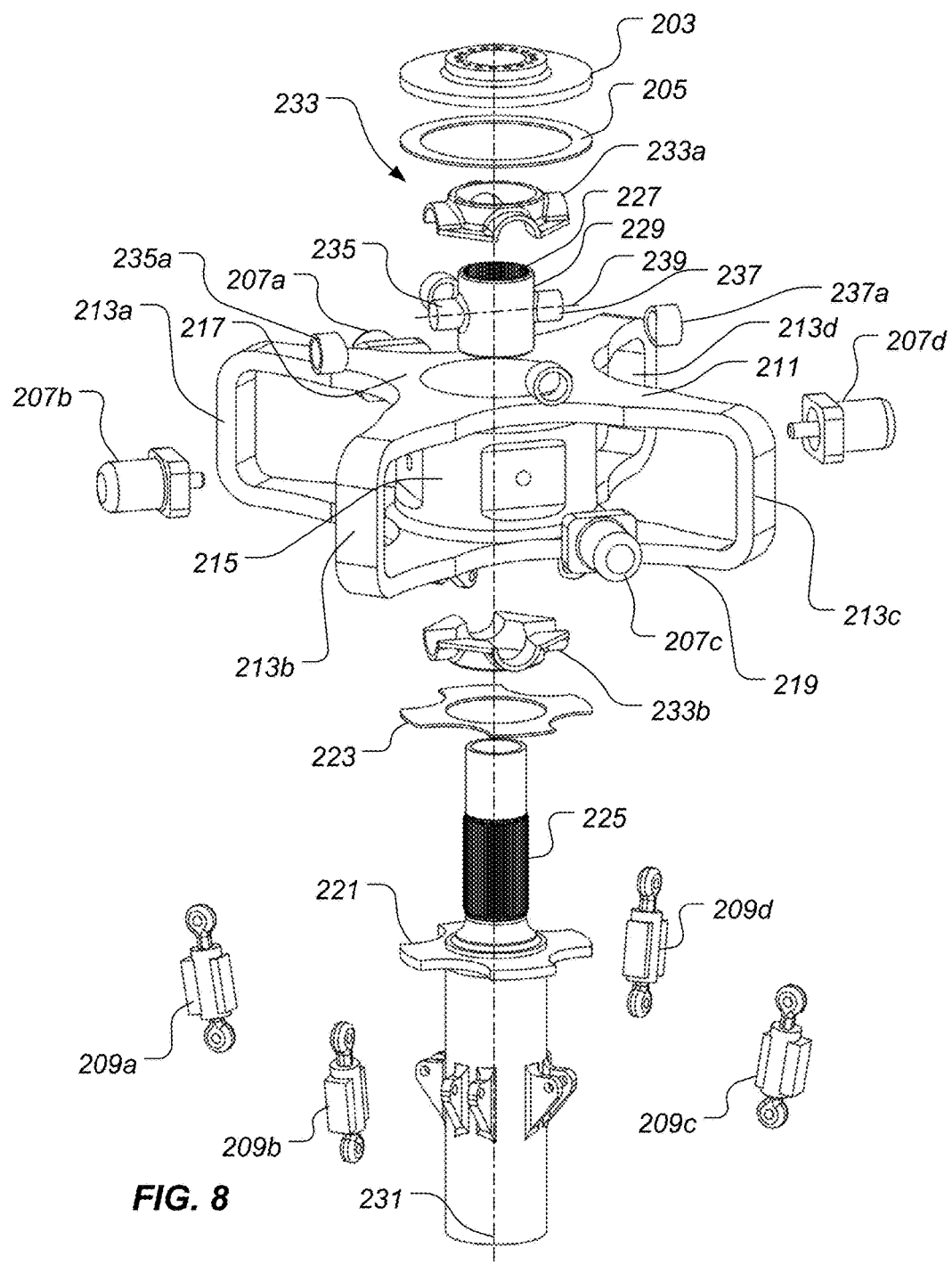
FIG. 8 is an exploded view of the rotor hub of the rotorcraft, according to an example embodiment.

During operation of rotorcraft 101, rotor hub 103 can experience various vibration types throughout the flight spectrum. One vibration type is vibration resulting from a flapping of the rotor blades. The rotor blade flapping can be the result of unequal lifting forces being exerted on the rotor blades, such as high speed forward flight, which can cause the rotor hub to teeter. Another vibration type is a vibration resulting from a "pin wheeling" action. Pin wheeling can be the result of a tilting of the rotor hub which can cause the rotor mast to be pulled in a direction perpendicular to the rotor mast axis. The perpendicular force then has a tendency to travel around the azimuth of the mast. As the rotor hub rotates, the pulling of the rotor mast turns into a whirling effect as the rotor mast is continuously pulled. Another vibration mode can develop when the dynamics of the rotor system combine to create a force which oscillates on a single axis perpendicular to the mast, such as axis 241 (shown at least in FIG. 7), such an oscillation can be referred to as "hub shift." Another vibration type is a vertical vibration or "chucking" from vertical component vibratory loads generated in the flight regime.

Referring now also to FIGS. 2-8, rotor hub 103 is illustrated in further detail. The rotor hub 103 incorporates structural features which allow the torque from rotor mast 201 to be transferred to a yoke 211 while also being compliant in a direction for vibration attenuation. Further, rotor hub 103 incorporates actuators actively to counter or attenuate vibrations that may result from one or more vibration inducing vibratory modes, such as rotor blade flapping, hub whirling, hub shifting, and vertical oscillations. One object of the embodiments in the present disclosure is to substantially eliminate the oscillatory vibrations in the rotor hub 103 to prevent the oscillatory vibrations from being transmitted through mast 201 to the body of rotorcraft 101.

Rotor hub 103 can include a hub member or yoke 211 coupled between a mast 201 and a plurality of rotor blades, such as rotor blades 105 (shown in FIG. 1). In the example embodiment, yoke 211 includes a central portion 215, an upper portion 217, a lower portion 219, and looped arms 213a-213d. Central portion 215 centrally connects upper portion 217 and lower portion 219. Each looped arm 213a-213d connects upper portion 219 and lower portion 219 and a discreet extension where each rotor blade, such as a rotor blade 105, is coupled thereto. In an example embodiment, each rotor blade 105 has a rotor blade grip that is coupled to one of looped arms 213a-213d via one or more bearings. It should be fully appreciated that the exact configuration of yoke 211 and the attachment of rotor blades 105 thereto is implementation specific. Further, yoke 211 is illustrated for the usage of four rotor blades; however, it should be appreciated that any reasonable number of rotor blades can be utilized and rotor hub 103 be adapted accordingly. Additionally, the hub/yoke to blade attachment configuration can be vertically arranged (as shown), horizontally arranged, arranged in a bolted joint configuration, arranged in pass through yoke/snubber configuration, or any other implementation specific arrangement that still allows for the functionality of the vibration control system described herein.

Mast 201 includes a splined portion 225 that mates with a splined portion 227 of a pivot member 229. The splined connection of pivot member 229 and mast 201 allows for a limited amount of sliding of pivot member 229 along a mast axis 231, but also rigid transfer of torque between mast 201 and pivot member 229. Pivot member 229 has a rigid first cylindrical extension 235 and rigid second cylindrical extension 237 each extending in opposite directions along an axis 239. Cylindrical elastomeric members 235a and 237a fit between first cylindrical extension 235 and second cylindrical extension 237, respectively, and cylindrical openings of a gimbal ring 233. Gimbal ring 233 is illustrated as having an upper half 233a and a lower half 233b that collectively form gimbal ring 233. Cylindrical elastomeric members 235a and 237a are relatively rigid radially to axis 239 (to transmit the torque and vertical loads required by helicopter operation) but compliant in a direction along axis 239.

Central portion 215 of yoke 211 includes a first cylindrical post 243 and a second cylindrical post 245, each extending in opposite directions along an axis 241. Cylindrical elastomeric members 243a and 245a fit between first cylindrical post 243 and a second cylindrical post 245, respectively, and cylindrical openings of gimbal ring 233. Cylindrical elastomeric members 243a and 245a are relatively rigid radially to axis 241 (to transmit the torque and vertical loads required by helicopter operation) but compliant in a direction along axis 241.

The example embodiment, the torque from rotor mast 201 is transferred to the pivot member 229, then to gimbal ring 233 via extensions 235 and 237, then to the yoke 211 via posts 243 and 245.

Rotor hub 103 can also include an upper cap 203 and an elastomeric member 205 adjacent to an upper surface of yoke 211 to keep yoke 211 to place an upper vertical on yoke 211 along mast 201. Similarly, a lower cap 221 and an elastomeric member 223 can be located adjacent to a lower surface of yoke 211 to place a lower vertical limitation on yoke 211 along mast 201.

Rotor hub 103 can include actuators 207a-207d that are radially oriented and located in a plane perpendicular to the rotor mast axis 231. Actuators 207a and 207c each have piston rods axially disposed along axis 241 that bear against opposing surfaces of pivot member 229. Actuators 207a and 207c are configured to work in unison to selectively actuate a force upon mast 201 in a direction along axis 241. The actuation of actuators 207a and 207c can cause a displacement of yoke 211 relative to mast 201 along axis 241, which can cause a shearing deflection of elastomeric members 243a and 245a. Further, actuators 207b and 207d each have piston rods axially disposed along axis 239 that bear against opposing surfaces of first extension 235 and second extension 237 of pivot member 229. Actuators 207b and 207d are configured to work in unison to selectively actuate a force upon mast 201 in a direction along axis 239. The actuation of actuators 207b and 207d can cause a displacement of yoke 211 relative to mast 201 along axis 239, which can cause a shearing deflection of elastomeric members 235a and 237a.

During an actuation of actuators 207a and 207c, the pivot member 229 will translate relative to yoke 211 along axis 241, thus causing the piston rods associated with actuators 207b and 207d to slide against the bearing surfaces of first extension 235 and second extension 237 of pivot member 229. Similarly, during actuation of actuators 207b and 207d, the pivot member 229 will translate relative to yoke 211 along axis 239, thus causing the piston rods associated with actuators 207a and 207c to slide against the bearing surfaces of pivot member 229. It should be appreciated that actuators 207a-207d can be any implementation specific type of actuator, such as electric, hydraulic, pneumatic, piezoelectric, to name a few examples.

Rotor hub 103 can also include actuators 209a-209d that are coupled between rotor mast 201 and lower portion 219 of yoke 211. Each actuator 209a-209d is oriented substantially vertical but also slightly cantilevered out toward a respective looped arm 213a-213d where a respective rotor blade 105 is coupled thereto. In the example embodiment, actuator 209a is aligned with looped arm 213a, actuator 209b is aligned with looped arm 213b, actuator 209c is aligned with looped arm 213c, and actuator 209d is aligned with looped arm 213d. Each actuator 209a-209d is configured to selectively impart a force upon yoke 211, which can cause a small translation of yoke 211 relative to mast 201. It should be appreciated that actuators 209a-209d can be any implementation specific type of actuator, such as electric, hydraulic, pneumatic, piezoelectric, to name a few examples.

The force generated by actuators 207a-207d and 209a-209d has a powerful but small stroke distance, such as approximately 0.050 of an inch. Considering the small stroke distance, the force may be similar to a bump.

Actuators 209a-209d and actuators 207a-207d are configured either alone or in combination to attenuate one or more types of vibration that may arise during operation of the rotorcraft 101. A control system, such as control system 247, is in communication with vibration sensors, such as accelerometers, for detecting vibration. Further, control system 247 can include a processor for analyzing the source and direction of the vibration. The control system 247 is configured to selectively command actuators 209a-209d and actuators 207a-207d.

During a pin wheeling vibration, or an in-plane whirling effect between the mast 201 and yoke 211, control system 247 is configured to selectively actuate actuators 207a-207d to counter the whirling and misalignment between the mast axis 231 and the center of yoke 211. Actuators 207a-207d can selectively push mast 201 in directions along axes 239 and 241; thereby forcing axial alignment of mast 201 and yoke 211 and attenuating the vibration stemming therefrom.

During a hub shifting vibration between the mast 201 and yoke 211, control system 247 is configured to selectively actuate actuators 207a-207d to counter the hub shifting. Actuators 207a-207d can selectively push mast 201 substantially in a single direction, such as a direction along one of axes 239 and 241, or any vector combination thereof; thereby forcing axial alignment of mast 201 and yoke 211 and attenuating the vibration stemming therefrom.

Figure 6:
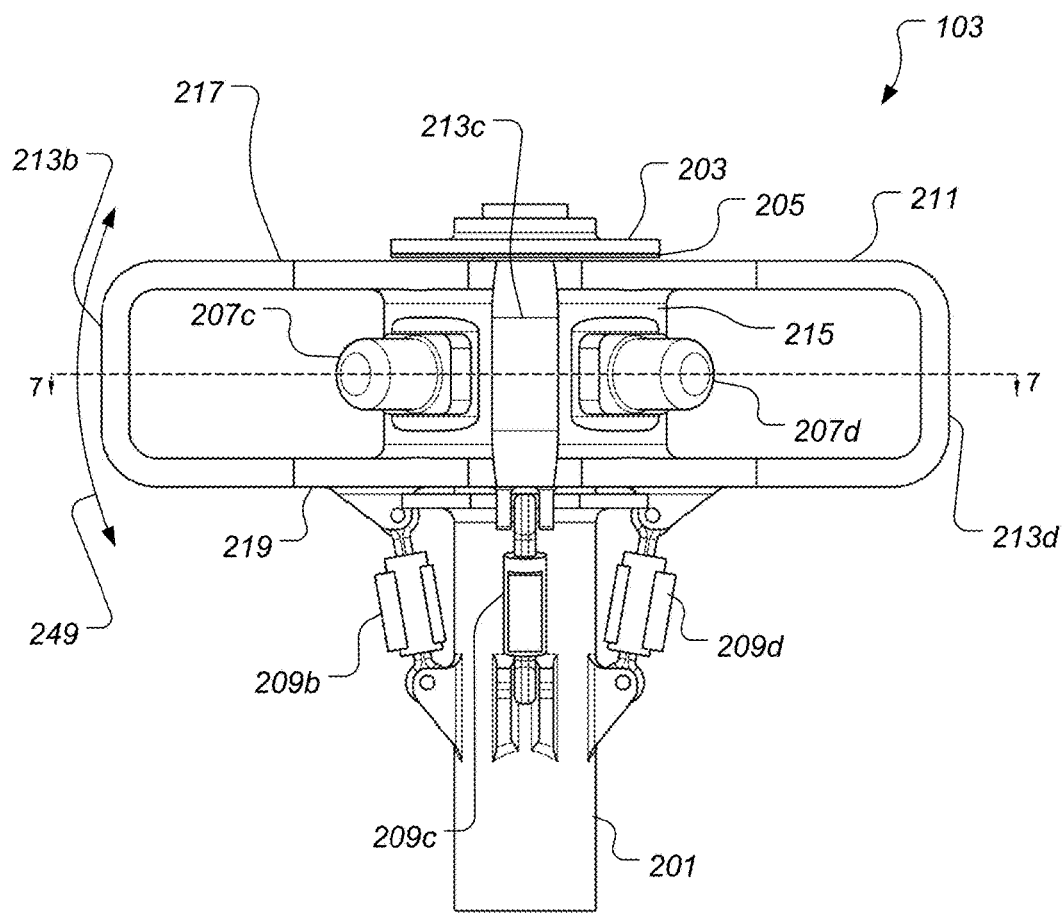
FIG. 6 is a side view of a rotor hub of the rotorcraft, according to an example embodiment.

During a flapping variation of rotor blades 105 associated with looped arms 213a-213d of yoke 211, flapping vibration can be generated. An illustrative flapping direction is illustrated in FIG. 6 as flapping direction 249, which corresponds with looped arm 213b. In order to attenuate any vibration resulting from rotor blade flapping, any of actuators 209a-209d can be selectively actuated to counter the flapping load or deflection. For example, if a rotor blade were to flap up, then the actuator associated with that rotor blade can be actuated to pull on the particular looped arm associated with that particular rotor blade. Thus each of actuators 209a-209d can be individually actuated once or more within a single revolution to attenuated vibration from rotor blade flapping.

During a vertical vibration or "chucking" from vertical component vibratory loads, actuators 209a-209d can be collectively actuated to counter the vertical oscillations. Elastomeric members 205 and 223 can provide the vertical compliance necessary for translating the yoke along mast axis 231 and on spline 225. To counter a single upward vertical oscillation of yoke 211, then the actuators 209a-209d collectively pull yoke 211 downward, for example.

Figure 9:
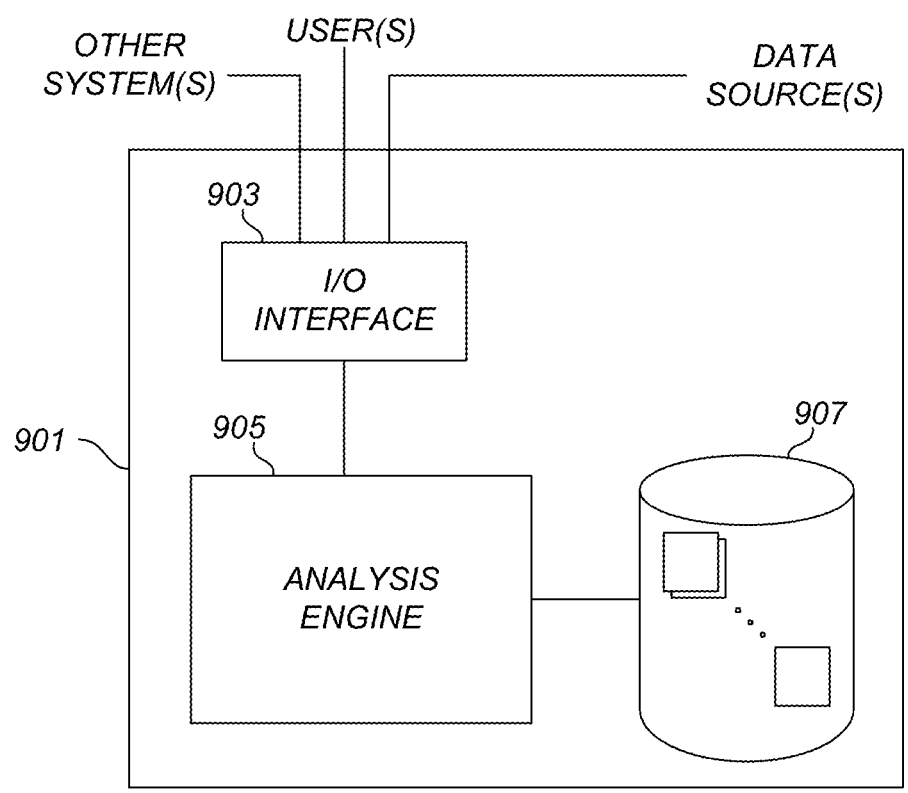
FIG. 9 is a schematic view of a computer system, according to example embodiment.

Referring now also to FIG. 9, a computer system 901 is schematically illustrated. System 901 can be configured for performing one or more functions with regard to the operation of rotor hub 103. More specifically, system 901 can be configured for performing one or more functions with regard to the operation of control system 247. Further, any processing and analysis can be partly or fully performed by computer system 901. Computer system 901 can be partly or fully integrated with other computer systems. In one example, computer system 901 is integrated with the flight control computer in rotorcraft 101.

The system 901 can include an input/output (I/O) interface 903, an analysis engine 905, and a database 907. Alternative embodiments can combine or distribute the input/output (I/O) interface 903, analysis engine 905, and database 907, as desired. Embodiments of the system 901 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 903 can provide a communication link between external users, systems, and data sources and components of the system 901. The I/O interface 903 can be configured for allowing one or more users to input information to the system 901 via any known input device. Examples can include a keyboard, mouse, touch screen, and/or any other desired input device. The I/O interface 903 can be configured for allowing one or more users to receive information output from the system 901 via any known output device. Examples can include a display monitor, a printer, and/or any other desired output device. The I/O interface 903 can be configured for allowing other systems to communicate with the system 901. For example, the I/O interface 903 can allow one or more remote computer(s) to access information, input information, and/or remotely instruct the system 901 to perform one or more of the tasks described herein. The I/O interface 903 can be configured for allowing communication with one or more remote data sources. For example, the I/O interface 903 can allow one or more remote data source(s) to access information, input information, and/or remotely instruct the system 901 to perform one or more of the tasks described herein.

The database 907 can provide persistent data storage for system 901. While the term "database" is primarily used, a memory or other suitable data storage arrangement may provide the functionality of the database 907. In alternative embodiments, the database 907 can be integral to or separate from the system 901 and can operate on one or more computers. The database 907 preferably provides non-volatile data storage for any information suitable to support the operation of actuators 207a-207d and 209a-209d, including various types of data. The analysis engine 905 can include various combinations of one or more processors, memories, and software components.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A rotor hub for a rotary aircraft, the rotor hub comprising:
   a rotor mast having a rotor mast axis;
   a yoke;
   a plurality of cantilevered actuators coupled between the rotor mast and the yoke, the plurality of cantilevered actuators being configured to selectively impart a force upon the yoke;
   a first plurality of radial actuators adjacent to the rotor mast, each of the first plurality of radial actuators having a piston configured to actuate in a direction that is perpendicular to the rotor mast axis to selectively impart a force upon the mast;
a pivot member splined to the rotor mast, the pivot member having a first extension and a second extension that define a first axis;
a first post and second post extending from the yoke and defining a second axis;
a gimbal ring that houses the first post, the second post, the first extension and the second extension;
a first cylindrical elastomeric member and a second cylindrical elastomeric member configured to be relatively rigid radially along the first axis and compliant in a direction along the first axis, the first cylindrical elastomeric member disposed on the first extension, the second cylindrical elastomeric member disposed on the second extension; and
a third cylindrical elastomeric member and a fourth cylindrical elastomeric member configured to be relatively rigid radially along the second axis and compliant in a direction along the second axis, the third cylindrical elastomeric member disposed on the first post, the fourth cylindrical elastomeric member disposed on the second post.

2. The rotor hub according to claim 1, further comprising:
a plurality of rotor blades;
wherein each of the plurality of cantilevered actuators is coupled to an arm of the yoke, each arm defining a location of a rotor blade.

3. The rotor hub according to claim 1, further comprising a second plurality of radial actuators comprising:
a first radial actuator; and
a second radial actuator;
wherein the first radial actuator and the second radial actuator each have a piston configured to actuate in a direction along the second axis to impart a force on the pivot member.

4. The rotor hub according to claim 3, wherein either of the first radial actuator and the second radial actuator causes a translation of the yoke relative to the rotor mast along an axis defined by the first radial actuator and the second radial actuator.

5. The rotor hub according to claim 1, further comprising:
a control system configured to analyze vibration measurement and command at least one of the plurality of cantilevered actuators and the first plurality of radial actuators.

6. A rotor hub for a rotorcraft, the rotor hub comprising:
a yoke, the yoke having an upper portion, a lower portion, and a central portion, the central portion connects the upper portion and the lower portion;
a mast having a mast axis;
a first radial actuator disposed within the central portion of the yoke and adjacent to the mast to impart a force upon the mast;
a second radial actuator disposed within the central portion of the yoke and adjacent to the mast to impart a force upon the mast;
a pivot member splined to the mast, the pivot member having a first extension and a second extension that define a first axis;
a first post and second post extending from the yoke and defining a second axis;
a gimbal ring that houses the first post, the second post, the first extension and the second extension;
a first cylindrical elastomeric member and a second cylindrical elastomeric member configured to be relatively rigid radially along the first axis and compliant in a direction along the first axis, the first cylindrical elastomeric member disposed on the first extension, the second cylindrical elastomeric member disposed on the second extension; and
a third cylindrical elastomeric member and a fourth elastomeric member configured to be relatively rigid radially along the second axis and compliant in a direction along the second axis, the third cylindrical elastomeric member disposed on the first post, the fourth cylindrical elastomeric member disposed on the second post;
wherein the first radial actuator and the second radial actuator each have a piston configured to actuate in a direction along the first axis to impart a translation of the yoke relative to the mast.

7. The rotor hub according to claim 6, wherein the first radial actuator and the second radial actuator are aligned along a plane perpendicular to the mast axis.

8. The rotor hub according to claim 6, further comprising:
a third radial actuator; and
a fourth radial actuator;
wherein the third radial actuator and the fourth radial actuator each have a piston configured to actuate in a direction along the second axis to impart a translation of the yoke relative to the mast.

9. The rotor hub according to claim 8, wherein the translation is along an axis defined by the third radial actuator and the fourth radial actuator.

10. The rotor hub according to claim 1, wherein the first axis is perpendicular to the second axis.

* * * * *